United States Patent [19]
Imai

[11] Patent Number: 6,069,865
[45] Date of Patent: May 30, 2000

[54] METHOD AND APPARATUS FOR CUTTING APART OF A MAIN SIGNAL AND RECORDING IT AS A SYNCHRONOUS SIGNAL

[75] Inventor: Kenichi Imai, Tokyo, Japan

[73] Assignee: Sony Corporation, Tokyo, Japan

[21] Appl. No.: 08/931,742

[22] Filed: Sep. 16, 1997

[30] Foreign Application Priority Data

Sep. 26, 1996 [JP] Japan .................................. 8-254302

[51] Int. Cl.[7] ........................... G11B 20/10; G11B 20/12
[52] U.S. Cl. ...................... 369/124; 369/48; 369/275.3; 704/229; 704/212
[58] Field of Search ............................... 369/48, 59, 53, 369/70, 275.3, 58, 124, 54; 704/229, 212, 500; 360/62, 32

[56] References Cited

U.S. PATENT DOCUMENTS

| | | | |
|---|---|---|---|
| 4,995,026 | 2/1991 | Makabe et al. | 369/70 |
| 5,200,943 | 4/1993 | Sano et al. | 369/48 |
| 5,687,157 | 11/1997 | Imai et al. | 369/124 |
| 5,745,454 | 4/1998 | Yokota | 369/48 |
| 5,841,749 | 11/1998 | Sako | 369/59 |
| 5,864,800 | 1/1999 | Imai et al. | 704/229 |

FOREIGN PATENT DOCUMENTS 9-6399  1/1997  Japan ............................. G10L 9/18

OTHER PUBLICATIONS

B. Atal et al., "Predictive Coding of Speech Signals," The 6th International Congress on Acoustics, Tokyo, Aug. 21–28, 1968, pp. C–13–C–16.

J. Ziv et al., "A Universal Algorithm for Sequential Data Compression," IEEE Transactions on Information Theory, vol. IT–23, No. 3, May 1977, pp. 337–343.

F. Jelinek, "Buffer Overflow in Variable Length Coding of Fixed Rate Sources," IEEE Transactions on Information Theory, vol. IT–14, No. 3, May 1968, pp. 490–501.

D. Huffman, "A Method for the Construction of Minimum-–Redundancy Codes," Proceedings of the I.R.E., vol. 40–1952, Sep. 1952, pp. 1098–1101.

*Primary Examiner*—Tan Dinh
*Assistant Examiner*—Kim-Kwok Chu
*Attorney, Agent, or Firm*—Limbach & Limbach LLP; Seong-Kun Oh

[57] ABSTRACT

Method and apparatus for encoding sub information is provided for synchronizing the main information of a digital audio disk with the sub information thereof. A sub signal encoding unit is composed as part of a unit for recording a signal of a digital audio disk. The sub signal encoding unit is inputted with a main signal having a format of the digital audio disk and a sub signal for improving the sound quality of the audio signal. A data cutting section is provided with the main signal and takes out part of the main signal as a synchronous signal. A Q channel generating section operates to replace the format of the synchronous signal with the Q channel data format so that the synchronous signal may be recorded in the Q channel of the subcode of the digital audio disk. A subcode encoding section is provided with the sub signal and the Q channel data and encodes the sub signal according to the format of the subcode.

94 Claims, 9 Drawing Sheets

METHOD AND APPARATUS FOR CUTTING APART OF A MAIN SIGNAL AND RECORDING IT AS A SYNCHRONOUS SIGNAL

BACKGROUND OF THE INVENTION

1. Field of the Invention

The present invention relates to digital audio signal processing, and more particularly to a method for encoding sub information contained in a signal having the sub information and main information, a recording medium, and a method and an apparatus for reproducing a signal.

2. Description of the Related Art

In general, a digital audio signal reproduced from a digital medium such as a digital audio disk is formatted to have a digital audio signal served as main information and an area termed a subcode containing sub information such as graphic information and text information.

Herein, a signal format of a compact disk, which is a digital audio disk, will be described with reference to the drawings. As shown in FIG. 1, the signal format of the digital audio disk has a frame unit as a minimum information unit. 98 frames compose one block. One frame is composed of an audio signal 6 samples (one of which is composed of 16 bits) of Right channel and 6 samples of Left channel totalling 24-byte data and a one-byte data as a subcode. It means that one block of the subcode is composed of 98 bytes.

FIG. 2 is an explanatory view showing the format of the subcode of the digital audio disk. The first two frames of one block, $S_0$ and $S_1$, each of which is a 2-byte data, are used as a synchronous signal to the subcode itself. Hence, the third frame or later one, which are in total composed of 96 bytes, are used as data of the sub information. Each frame of the subcode is composed of 8 bits (1 byte). Each bit of the frame is called P, Q, R, S, T, U, V, or W channel.

The P channel is used for indicating the position of the head of a tune of an audio signal corresponding to the main information. In particular, it is used for roughly locating the head of the tune. As shown in FIG. 3, the Q channel is sectioned into the head four bits for a control code, the subsequent four bits for an address code, the tail 16 bits for a code for a Cyclic Redundancy Code (CRC) of the error detecting signal, and the remaining 72 bits for the subject data. The control code is used for copy prohibition or identification of the kind of the recording medium. The address code is used as an address code of 72-bit data of the Q channel. In particular, if the address code is "0001", the 72-bit data of the Q channel indicates the format of each movement of the tune contained in the audio data as shown in FIG. 4. Further, the address codes of "0010" and "0011" are used as maker codes. In the other area of the Q channel, no format is specified. The data area may be arbitrarily used by a user.

The R to W channels are used as user channels. On these channels, the sub information such as graphic information and text information may be recorded as mentioned above.

In the Japanese Application No. Hei 7-147742, there has been proposed a technique of recording data for enhancing the sound quality of the audio signal on the data area of the subcode to be used by the user. The content will be described below.

The digital audio disk is formatted to have an audio signal sampled at 16 bits and 44.1 kHz. This signal is used for dividing the high-quality signal, for example, the 20-bit signal sampled at 88.2 kHz into the main information having a format of the digital audio disk and the sub information. The main information is recorded on the recording area of the normal main information. The sub information is recorded in the user channel of the sub code as a signal for enhancing the quality of the sound. In reproducing the signal, the main information is synthesized with the sub information for the purpose of supplying the audio signal having a higher sound quality than that of the normal digital audio disk.

On the contrary, the typical signal reproducing apparatus for the digital audio disk is arranged to read data from a recording medium through the use of a light pick-up unit and reproducing the main information for the audio signal and the sub information recorded on the subcode through the use of a demodulating LSI. At this time, the main information is stored in a memory built for temporarily saving the digital data read from the disk and synchronized to a stable clock before it is outputted. In practice, however, the sub information recorded in the subcode is being outputted at the same speed as the reading one of the information without being synchronized to such a stable clock. Hence, the output suffers from time fluctuation on called jitter, because the uneven rotation of a motor makes the reading speed unstable. This jitter takes place in not only the inside of the signal reproducing apparatus but also the digital output of the apparatus. For example, in a case that the signal reproducing apparatus provides a terminal and a signal having a digital audio format specified by IEC 958 (EIAJ CP1201) is outputted from the terminal, the fluctuation takes place in the user bit specified thereby.

Under these circumstances, with the data for enhancing the sound quality of the audio signal, the audio data corresponding to the main information is closely related with the sub information recorded in the subcode in light of time. Hence, it is preferable to synchronize the main information with the sub information.

SUMMARY OF THE INVENTION

The present invention is made in consideration of the abovementioned shortcomings, and it is an object of the present invention to provide a method for encoding sub information, a recording medium, and a method and an apparatus for reproducing a signal which are arranged to synchronize the main information contained in the digital audio disk, for example, with the sub information recorded in the subcode.

In carrying out the foregoing object in a preferred embodiment, according to in aspect of the present invention, a method for encoding sub information is characterized in encoding an input signal composed of main information and sub information so that part of the main information is added as synchronous information to the sub information before encoding the sub information.

According to another aspect of the invention, a method for encoding sub information is characterized in encoding an input signal composed of main information and sub information where blocks are formed at a unit of a constant information amount so that part of the main information is added as synchronous information to the sub information and the sub information is encoded together with the synchronous information, the synchronous information corresponding to a part of the main information of the corresponding block to the sub information.

According to an aspect of the invention, a recording medium is characterized in recording a signal composed of main information and sub information and having blocks formed at a unit of a constant information amount so that the sub information contains synchronous information corresponding to a part of the main information of the corresponding block to the sub information.

According to a further aspect of the invention, a method for reproducing a signal includes the steps of: dividing a signal composed of main information and sub information and having blocks formed at a unit of a constant information amount, the signal being reproduced from a recording medium and having the sub information with synchronous information corresponding to a part of the main information of the corresponding block to the sub information, into the main information and the sub information; detecting the synchronous information from the sub information; extracting a block of the sub information corresponding to the main information divided at the dividing step; and synthesizing a block of the sub information with a block of the main information and outputting the synthesized result.

According to yet another aspect of the invention, a signal reproducing apparatus includes: means for dividing a signal composed of main information and sub information and having blocks formed at a unit of a constant information amount, the signal reproduced from a recording medium and having the sub information with synchronous information corresponding to a part of the main information of the corresponding block to the sub information, into the main information and the sub information; means for detecting the synchronous information from the sub information divided by the dividing means; means for extracting a block of the sub information corresponding to the main information divided by the dividing means from the synchronous information detected by the detecting means; and means for synthesizing a block of the sub information extracted by the extracting means with a block of the corresponding main information and outputting the synthesized block.

According to a further aspect of the invention, a signal reproducing apparatus is arranged to divide the information recorded on the recording medium into main information and sub information and detects the synchronizing information from the sub information. Then, the block of the sub information corresponding to the main information divided by the dividing means is extracted from the synchronizing information. The block is synthesized with the block of the main information corresponding to the block of the sub information.

DESCRIPTION OF THE PREFERRED EMBODIMENTS

Figures 1, 2:
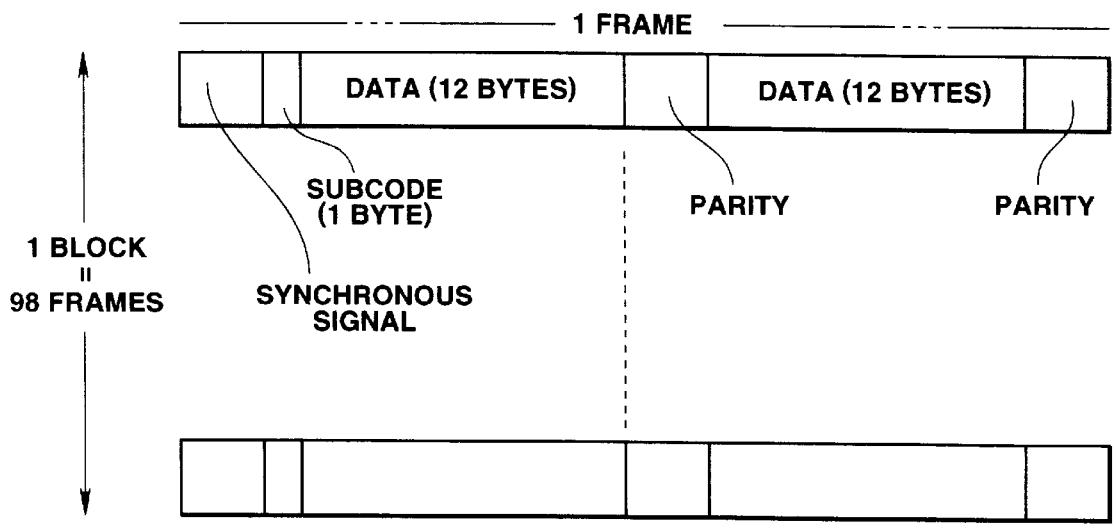
FIG. 1 is a view showing a format of a signal reproduced from a digital audio disk.
FIG. 2 is a view showing a format of a subcode of the digital audio disk.
Figure 3:
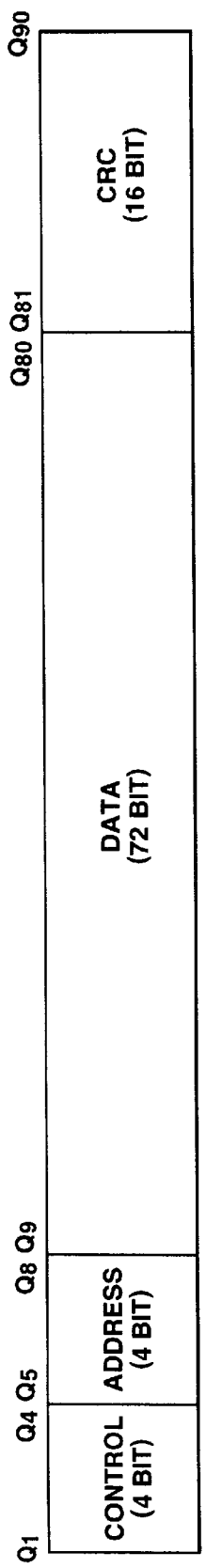
FIG. 3 is a view showing a format of a Q channel of the digital audio disk.
Figure 4:
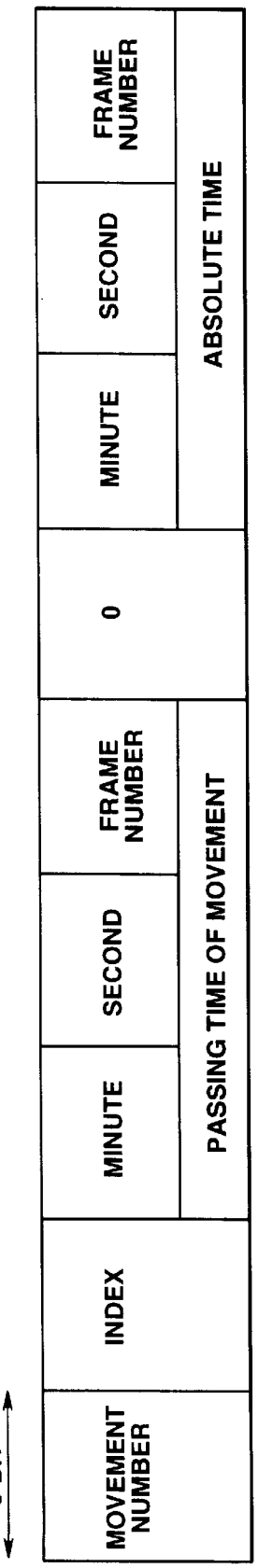
FIG. 4 is a view showing a format of a Q channel of the digital audio disk if an address is "0001".
Figure 5:
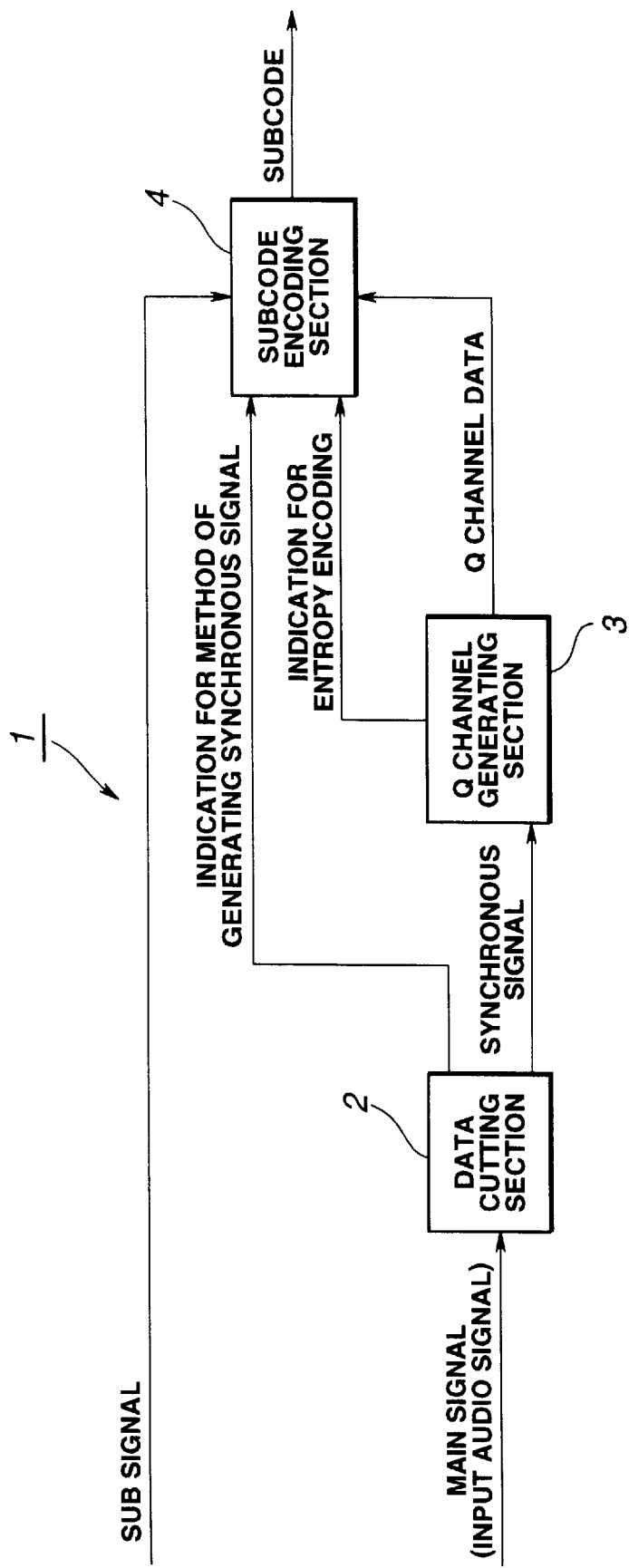
FIG. 5 is a block diagram showing a sub signal encoding unit according to the present invention.

FIG. 5 is an explanatory view showing a sub signal encoding unit according to the present invention. The sub signal encoding unit 1 is part of a signal recording apparatus for recording an audio signal on a compact disk, that is, a digital audio disk.

The sub signal encoding unit 1 is composed of a data cutting section 2, a Q channel generating section 3, and a subcode encoding section 4.

The sub signal encoding unit 1 is provided with an audio signal and a sub signal. The audio signal corresponds to the main information of the digital audio disk. The sub signal is added to the main signal for enhancing the sound quality of the main signal.

The main signal and the sub signal can be obtained by dividing the higher quality signal (higher quality than the 16-bit digital signal sampled at 44.1 kHz that is a format of the digital audio disk), for example, a 20-bit signal sampled at 88.2 kHz, into the main signal that has a format of the digital audio disk and the other sub signal. Hence, the main signal has the same format as the audio signal of the digital audio disk. Concretely, the main signal is a 16-bit digital signal sampled at 44.1 kHz. The sub signal contains a higher band component than the main signal. The sub signal serves to improve the sound quality of the audio signal.

The main signal is inputted into the data cutting section 2 included in the sub signal encoding unit 1.

The data cutting section 2 is used for taking out a synchronous signal of the sub signal from part of the main signal. This synchronous signal can be obtained by taking out the main signal at each block. The capacity of the synchronous signal is variable according to the data capacity of the area where the synchronous signal is recorded. In a case where the synchronous signal is recorded in the subcode of the digital audio disk, it is possible to consider the method for writing the synchronous signal on the R to W channels and the method for writing the synchronous signal on the Q channel. For the method for writing the synchronous signal on the R to W channels, the sub signal is written in this area. Hence, the data may be recorded on the other area rather than the area where the sub signal is written unless the data uses all of the R to W channels. In this case, it is necessary to record a signal for identifying the sub signal from the synchronous signal. On the other hand, for the method for writing the synchronous signal in the Q channel, it is possible to allocate the capacity of 72 bits that corresponds to a data area of the Q channel. The four address bits of the Q channel are required to take the other addresses rather than "0001", "0010", "0011" set to the format. The following description will be oriented to the method for writing the synchronous signal in the Q channel.

Figure 6:
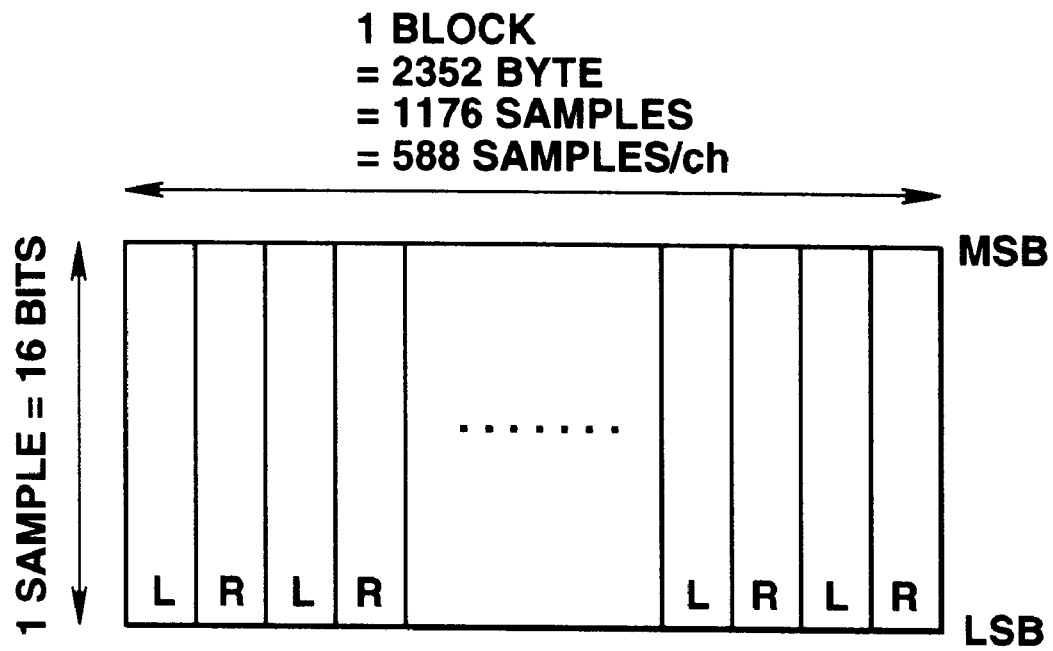
FIG. 6 is a view showing a format of a signal of a digital audio disk.
Figure 7A:
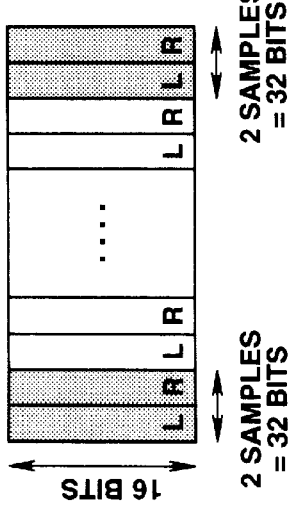
FIGS. 7A–7E are explanatory views showing a method for cutting out a sub signal.
Figure 7B:
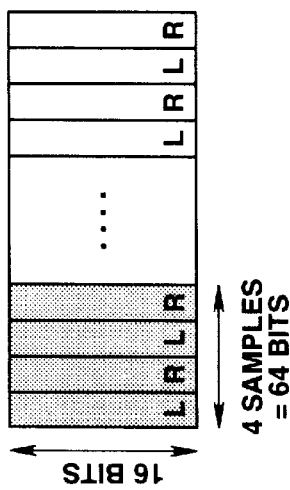
Figure 7C:
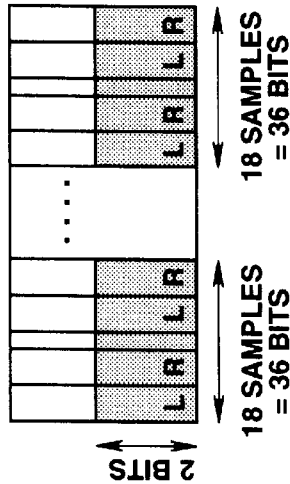
Figure 7D:
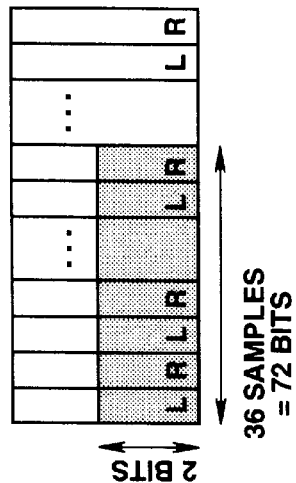
Figure 7E:
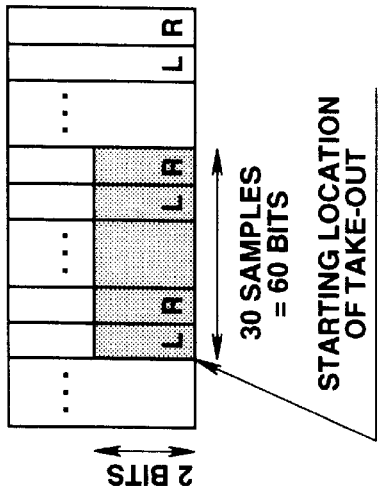

The data cutting section 2, as shown in FIG. 6, is arranged to simply cut out the same data from each block of the main signal, the total cut data being composed of 72 bits, which corresponds to the data capacity of the Q channel.

The five examples of the way of cutting out the synchronous signal from the main signal is shown in FIG. 7. The first cutting method shown in FIG. 7A utilizes the sample located at the head of the block as is. In this way, a synchronous signal of 64 bits corresponding to four samples can be created. In place of the head at the block, the four samples of the tail of the block may be used for cutting out the synchronous signal. The second cutting method shown in FIG. 7B utilizes two samples of the head at the block and another two samples of the tail of the block. Like the first method, the synchronous signal of 64 bits can be cut out. The third cutting method shown in FIG. 7C utilizes the least significant bits (referred to as LSB) at the head or the tail of the block. The illustrative cutting way utilizes 2 bits. Hence, the synchronous signal of 72 bits that corresponds to 36 samples can be created. The fourth cutting method shown in FIG. 7D utilizes some bits of the LSB of some samples located at the head and the tail of the block. In this cutting method, the synchronous signal composed of a total of 72 bits, in practice, creates 18 samples at the head and another 18 samples at the tail. The fifth cutting method shown in FIG. 7E utilizes some bits of the LSB at a given sample spaced from the head of the block by some samples. In the aforementioned cutting methods except the method of FIG. 7E, all the synchronous information is made zero if the locations of the samples to be taken out are made zero. It means that the synchronous information is not so effective. In such a case, this way is effective. This fifth method needs the information of the head location of the block where the samples are taken. The number of samples taken as the synchronous signal is made smaller as compared with the foregoing cutting methods. The head location of the block where the samples are taken may be a given location or found by searching a location where the sample is not zero.

In the third, the fourth and the fifth methods, the signal on the LSB side of the sample is used as the synchronous signal. In place, the signal on the most significant bit (referred to as MSB) side may be used as the synchronous signal. Or, the bit at any location (for example, spaced from the MSB by 7 or 8 bits) can be taken as the synchronous signal. Of course, the number of bits taken from one sample is limited to not only 2 but any number. In the second and the third cutting methods, a long sample may be used as the synchronous signal.

Further, the synchronous signal can be cut out at a unit of some blocks. In place of cutting the synchronous signal as a combination of Lch and Rch, the synchronous signal may be composed on one side of the Lch or Rch. Further, the synchronous signal may be selectively used according to the kind of the main signal. In this case, it is necessary to record the kind of the predetermined synchronous signal in the subcode.

The synchronous signal is supplied from the data cutting section 2 to the Q channel generating section 3.

The Q channel generating section 3 serves to replace the format of the synchronous signal with the format of the data of the Q channel, because the synchronous signal is required to be recorded on the Q channel. In the replacing operation, in place of recording the synchronous signal as it is, the reversible information such as entropy encoding may be compressed for efficiently recording the synchronous signal. The entropy encoding is executed on an encoding table for allocating a code for each sample value. The Huffman encoding is disclosed in "A Method for Construction of Minium Redundancy Codes", D. A Huffman, Proc.I.R.E., 40, pp. 1098, 1952. The entropy encoding is disclosed in "A Universal Algorithm for Sequential Data Compression", J. Ziv, A. Lempel, IEEE. Further, the Lempel-Ziv encoding disclosed in Trans. on Inform. Theory, Vol.It-23, No. 3, pp. 337–343, 1977 or the arithmetic codes disclosed in "Buffer Overflow in Variable Length Coding of Fixed Rate Source", F. Telinek, IEEE Trans. Inform. Theory, Vol.IT-14, No. 3, pp. 490–501, 1968 may be used for that purpose.

When recording the synchronous signal in the subcode of the Q channel, it is possible to record not on the block of the main signal but on the block spaced from the block of the main signal. This is because the signal reproducing apparatus (to be discussed below) enables synchronizing the main signal with the sub signal in the range of the volume of the memory for temporarily saving the main signal and the sub signal. In practice, it is convenient to locate the synchronous signal in advance of the block to be synchronized for the purpose of reducing the volume of the memory for temporarily saving the signals.

The Q channel data generated by the Q channel generating section 3 is supplied to the subcode encoding section 4. If the synchronous signal may be selectively used according to the kind of the main signal, or if the entropy encoding is applied to the generation of the Q channel, the identifying signal therefor is supplied to the subcode encoding section 4.

The subcode encoding section 4 is inputted with the sub signal for improving the sound quality of the audio signal, the Q channel data supplied from the Q channel generating section 3, and the identifying signal for encoding or the like, and is then encoded according to the format of the subcode.

The subcode encoded by the subcode encoding section 4 is subject to the Eight Fourteen Modulation (EFM) with the audio signal that is the main signal and is then recorded on the recording medium.

Hence, the sub signal encoded by the sub signal encoding unit 1 is recorded on the recording medium with the audio signal, that is, the main signal, is then synchronized with the sub signal through the effect of the signal reproducing apparatus (to be discussed below). By taking synchronization between the sub signal and the main signal, a higher quality audio signal can be reproduced.

The foregoing synchronous signal is generated by cutting the audio signal corresponding to the main signal. It may be generated by using linear prediction coefficients that represent the feature of the audio signal. In this case, the linear prediction coefficients themselves and the linear prediction degrees are used as the synchronous signal. This linear prediction coefficient is disclosed in "System for Decomposing, Synthesizing and Transmitting Speech based on Method for Estimating Likelihood Spectrum" Itakura, Saitou, Proceedings of the Acoustic Literary Society, pp. 231, 1967 or "Predictive Coding of Speech Signals", B. S. Atal, M. R. Schroeder, Reports of 6th Int. Conf. Acoust., C-5-4, 1968. In addition, the calculation algorithm has been described in many writings, which are thus left out herein.

Figure 8:
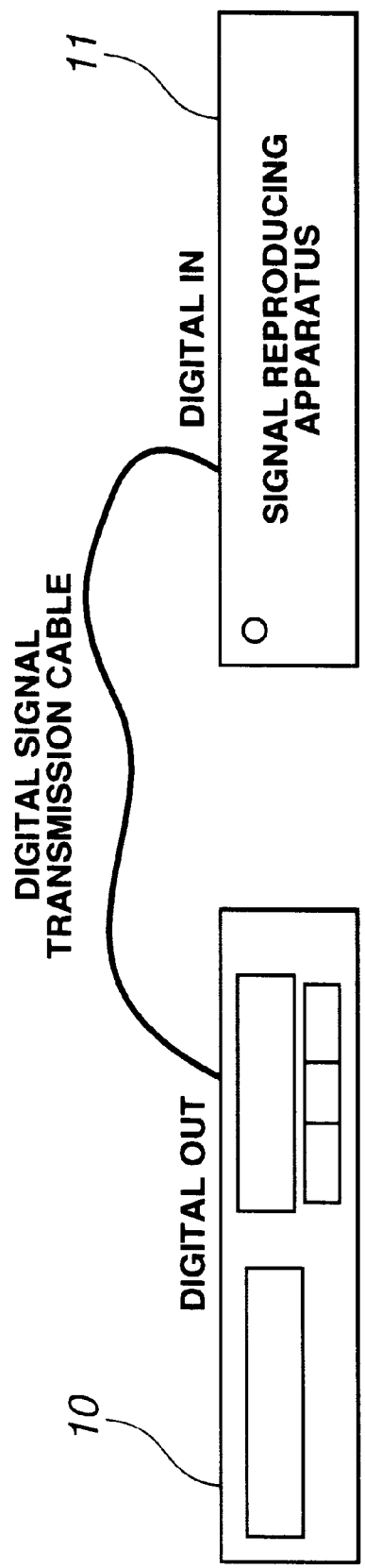
FIG. 8 is an explanatory view showing the connection of a signal reproducing apparatus according to the present invention to a digital audio disk player.

Rather, the description will be oriented to the signal reproducing apparatus for reproducing a signal from a recording medium where the sub signal encoded by the foregoing method is recorded. As shown in FIG. 8, the signal reproducing apparatus 11 is inputted with a signal outputted from a digital audio player 10 for reproducing a signal from a digital audio disk, or, in practice, a compact disk through a digital signal transmission cable.

Figure 9:
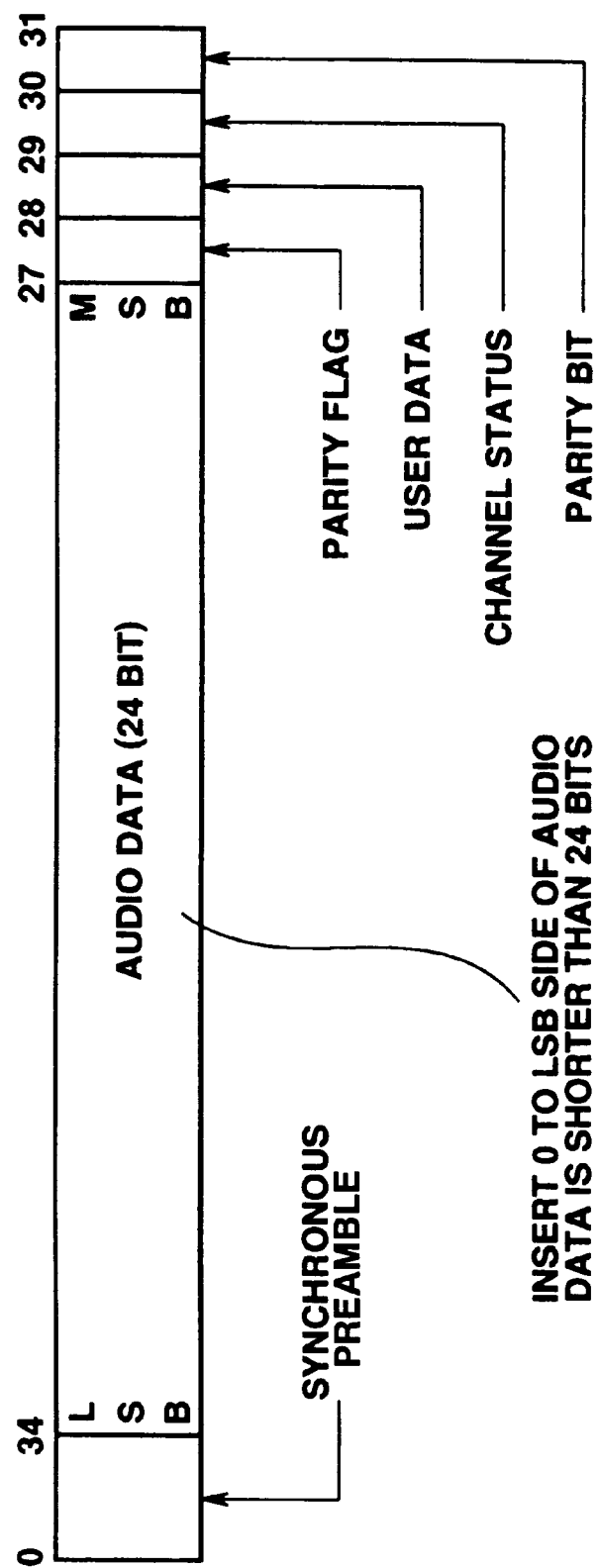
FIG. 9 is a view showing a digital audio format specified by IEC 958 (EIAJ CP1201).

The digital audio player 10 operates to reproduce a signal from a recording medium on which the sub signal is recorded. The reproduced signal is outputted from a digital out port. This signal has a digital audio format specified by IEC 958 (EIAJ CP1201) and corresponds to a converted signal of the format recorded on the recording medium. As shown in FIG. 9, each sample of the digital audio format specified by this IEC 958 is composed of a four-bit synchronous preamble, 24-bit audio data, a one-bit parity flag, a one-bit user data, a one-bit channel status, and a one-bit parity bit. The sub signal data recorded on the recording medium is contained in the user data of the IEC 958 format.

Figure 10:
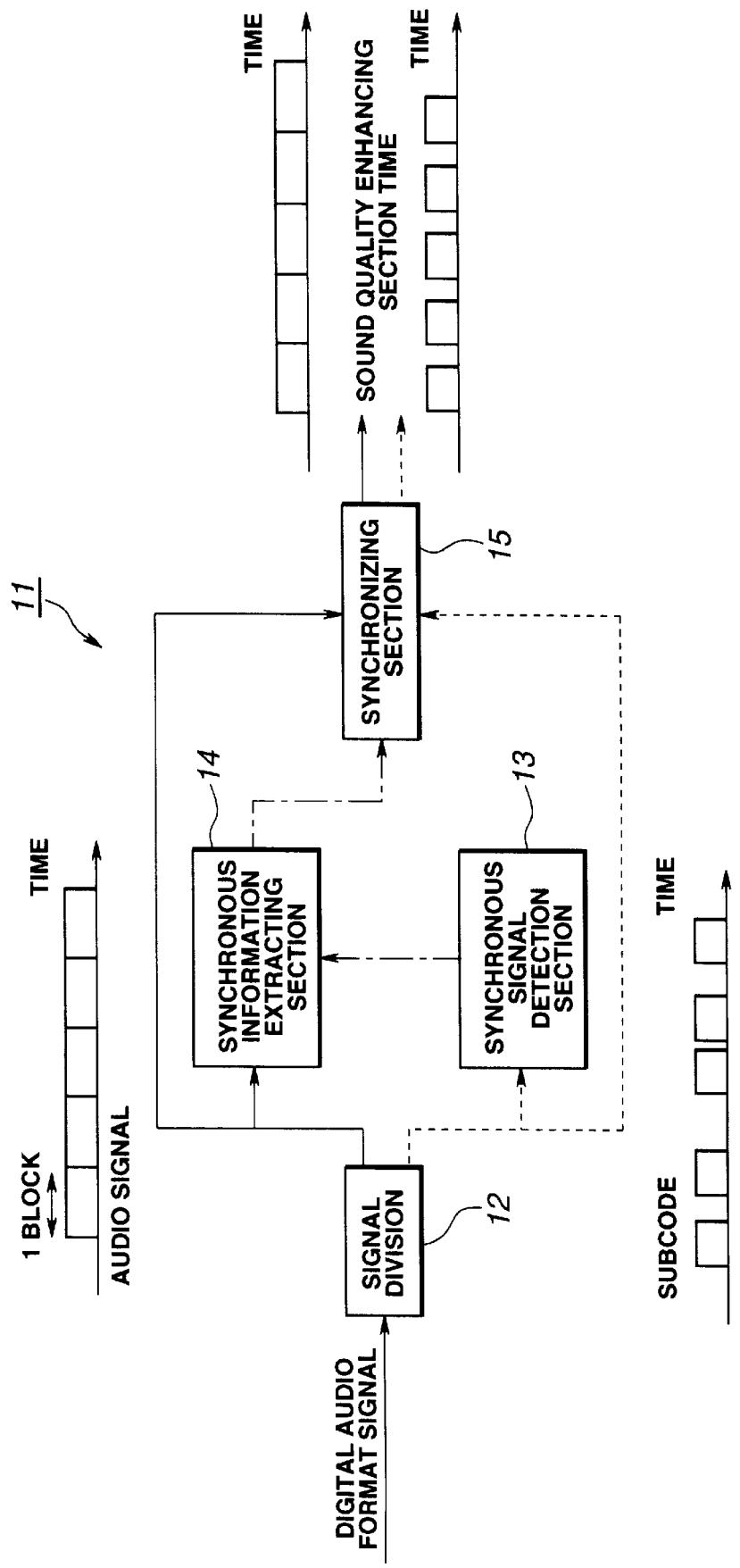
FIG. 10 is a block diagram showing a signal reproducing apparatus according to the present invention and FIG. 11 is an explanatory view showing a method for detecting synchronizing information.

The signal reproducing apparatus 11 is arranged to read a main signal and a sub signal from the IEC 958 format signal supplied from the digital audio player 10 for the purpose of enhancing the sound quality. As shown in FIG. 10, the signal reproducing apparatus 11 is arranged to have a signal dividing section 12, a synchronous signal detecting section 13, a synchronous information extracting section 14, a synchronizing section 15, and a sound quality enhancing section (not shown).

The signal dividing section 12 is provided with the signal of IEC 958 format and operates to divide the signal into the main signal and the sub signal. The sub signal is supplied to the synchronous signal detecting section 13 and the synchronizing section 15. The main signal is supplied to the synchronous information extracting section 14 and the synchronizing section 15.

The synchronous signal detecting section 13 operates to retrieve from the supplied sub signal the synchronous signal encoded for the Q channel by the sub signal encoding unit 1. Further, if the retrieved synchronous signal has been encoded by entropy encoding or the like, it is necessary to decode the synchronous signal. The synchronous signal retrieved by the synchronous signal detecting section 13 is supplied to the synchronous information extracting section 14.

The synchronous information extracting section 14 operates to compare the main signal inputted from the signal dividing section 12 with the synchronous signal inputted from the synchronous signal detecting section 13 for detecting the synchronizing location. The detected synchronizing location specifies the start or the end of a block and indicates the difference between the start and the end of the subcode. Further, if two or more kinds of synchronous signals are supplied and any one of the synchronous signals is selectively used according to the kind of the main signal, the signal indicating the kind of the synchronous signal is also inputted to the section 14.

Figure 11:
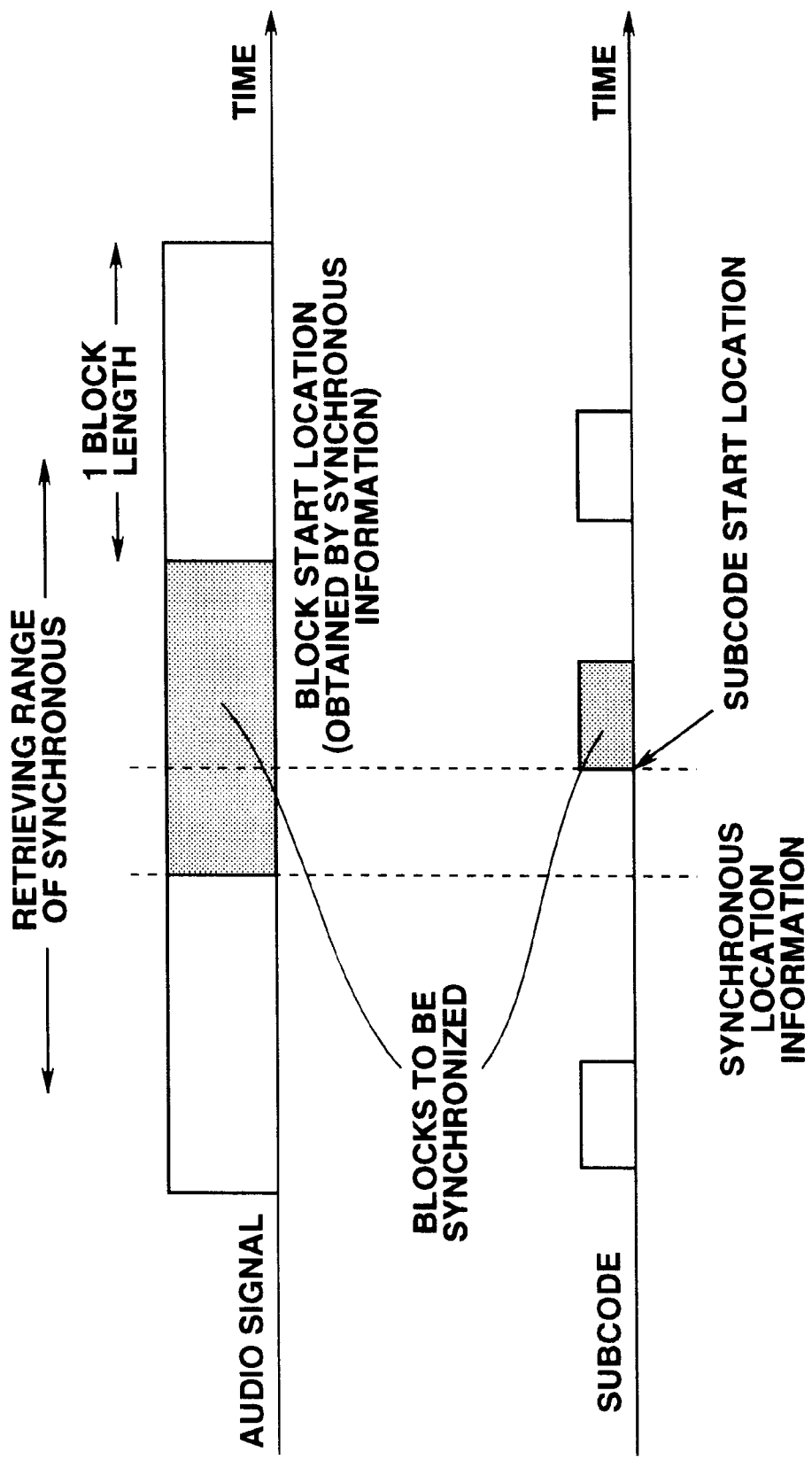

As shown in FIG. 11, the method for extracting the synchronous information is executed to perform an AND operation of the audio signal and the synchronous signal to shift the audio data by one sample in the retrieving range if the audio data itself is a synchronous signal to shift the audio data by two samples if the synchronous signal is a combination of Lch and Rch. The matching location of all samples are the synchronous location information. If a linear prediction coefficient is used as the synchronous signal, the coefficient is derived in each sample of the retrieving range. The location where a matching value to the linear prediction coefficient is derived are the synchronous location information. In any case, it is assumed that no error takes place in the read audio signal itself. In practice, the error of about $10^{-4}$ is presumed. For considering this error, if no matching location to the synchronous signal in the retrieving range is found, the least erroneous location can be assumed as the synchronous location.

As the retrieving range, it is necessary to retrieve each block before and after the start or the tail of the subcode. This is because the LSI for the general digital audio disk causes jitter of about 28 frames at maximum. It means that even the maximum jitter does not exceed one block.

The synchronous location information extracted by the synchronous information extracting section 14 is supplied to the synchronizing section 15. The synchronizing section 15 operates to supply the synchronous location information to the sound quality enhancing section (not shown) in the state of aligning the start locations of the blocks of the main signal and the sub signal divided by the signal dividing section 12 based on the synchronous location information extracted by the synchronous information extracting section 14.

The sound quality enhancing section operates to synthesize the main signal with the sub signal and outputs an audio signal that has a higher band than the normal digital audio format signal.

Hence, the signal reproducing apparatus 11 operates to reproduce a signal from a recording medium therein recorded is the sub signal encoded by the sub signal encoding unit 1 for the purpose of reproducing the main signal and the sub signal synchronized with each other. Hence, the signal reproducing apparatus 11 enables a high-quality audio signal reproduction having an improved sound quality rather than that outputted by the conventional digital audio disk. Further, the signal reproducing apparatus 11 enables the LSI for signal processing of the subcode to obtain synchronization. Hence, for reading the signal from the digital audio disk, the conventional LSI can be used. Moreover, the operation makes it possible to make an adaptor for being inputted with the signal from the digital out port.

The foregoing description has been described with the digital audio disk. However, the same method may be applied to the digital audio tape or the video disk for achieving synchronization.

As set forth above, the method for encoding the sub information is arranged to add part of the main information to the sub information as synchronous information and to encode the sub information with the synchronous information for the purpose of synchronizing the main information with the sub information.

The method for encoding the sub information is arranged to add a part of the main information to the sub information as synchronous information and encode the sub information with the synchronous information that is part of the main information of the corresponding block to the sub information. This makes it possible to obtain a block-by-block synchronization between the sub information and the main information and to determine the block segmentation of the main information.

The recording medium is arranged to record a signal having the synchronous information that is part of the main information of the corresponding block to the sub information. Hence, when reproducing the signal recorded on the recording medium, the main information can be synchronized with the sub information.

The method for reproducing a signal is arranged to divide the information recorded on the recording medium into the main information and the sub information, to detect the synchronous information from the sub information, to extract the block of the sub information corresponding to the main information divided by the dividing means from the synchronous information, to synthesize the block of the sub information with the block of the main information, and then output the synthesized result. This makes it possible to take synchronization between the main information and the sub information.

The signal reproducing apparatus is arranged to divide the information recorded on the recording medium into the main information and the sub information, to detect the synchronous information from the sub information, extract the block of the sub information corresponding to the main information divided by the dividing means from the synchronous information, to synthesize the block of the sub information with the block of the main information, and then output the synthesized result. This makes it possible to achieve synchronization between the main information and the sub information.

Many widely different embodiments of the present invention may be constructed without departing from the spirit and scope of the present invention. It should be understood that the present invention is not limited to the specific embodiments described in the specification.

What is claimed is:

1. A method for encoding sub code, comprising the steps of:

adding a part of a main information as synchronous information to a sub code, said main information and said sub code comprising an input signal; and encoding said input signal before encoding said sub code;

wherein said synchronous information is configured to synchronize said main information and said sub code.

2. A method for encoding sub code, comprising the steps of:

forming one or more blocks at a constant information unit such that a part of a main information is added as synchronous information to a sub code, said main information and said sub code comprising an input signal; and encoding said input signal such that said sub code is encoded together with said synchronous information;

wherein said synchronous information is configured to synchronize said main information and said sub code.

3. The method of claim 2, wherein at least one portion of said synchronous information is generated at each block.

4. The method of claim 2, wherein said synchronous information is generated at each group of a predetermined number of blocks.

5. The method of claim 2, wherein said synchronous information is a parameter for representing features of said main information.

6. The method of claim 2, wherein said synchronous information is changed according to the content of the main information.

7. The method of claim 6, wherein the generation information of said synchronous information changing according to the content of said main information is encoded with said sub code.

8. The method of claim 2, wherein said input signal is a digital audio signal.

9. The method of claim 2, wherein said input signal is a digital video signal.

10. A method for encoding sub code, comprising the steps of:

forming one or more blocks at a constant information unit such that a part of a main information is added as synchronous information to a sub code, said main information and said sub code comprising an input signal; and encoding said input signal such that said sub code is encoded together with said synchronous information;

wherein said synchronous information is configured to synchronize said main information and said sub code, and is composed of a given number of samples taken from a head of the block.

11. The method of claim 10, wherein said synchronous information is composed of given bits from the least significant bits of a given number of samples from a head of the block.

12. The method of claim 10, wherein said synchronous information is composed of given bits from the most significant bits of a given number of bits from a head of the block.

13. A method for encoding sub code, comprising the steps of:

forming one or more blocks at a constant information unit such that a part of a main information is added as synchronous information to a sub code, said main information and said sub code comprising an input signal; and encoding said input signal such that said sub code is encoded together with said synchronous information;

wherein said synchronous information is configured to synchronize said main information and said sub code, and is composed of a given number of samples taken from a tail of the block.

14. The method of claim 13, wherein said synchronous information is composed of given bits from the least significant bits of a given number of samples from a tail of the block.

15. The method of claim 13, wherein said synchronous information is composed of given bits from the most significant bits of a given number of samples from a tail of the block.

16. A method for encoding sub code, comprising the steps of:

forming one or more blocks at a constant information unit such that a part of a main information is added as synchronous information to a sub code, said main information and said sub code comprising an input signal; and encoding said input signal such that said sub code is encoded together with said synchronous information;

wherein said synchronous information is configured to synchronize said main information and said sub code, and is composed of a given number of samples taken from a head and a tail of the block respectively.

17. The method of claim 16, wherein said synchronous information is composed of given bits from the least significant bits of a given number of samples taken from the head and the tail of the block respectively.

18. The method of claim 16, wherein said synchronous information is composed of given bits from the most significant bits of a given number of samples taken from the head and the tail of the block.

19. A method for encoding sub code, comprising the steps of:

forming one or more blocks at a constant information unit such that a part of a main information is added as synchronous information to a sub code, said main information and said sub code comprising an input signal; and encoding said input signal such that said sub code is encoded together with said synchronous information;

wherein said synchronous information is configured to synchronize said main information and said sub code, and is composed of a given number of samples taken from the location spaced from the head of the block by a given number of samples.

20. The method of claim 19, wherein said synchronous information is composed of given bits from the least significant bits of a given number of samples taken from the location spaced from the head of the block by at given number of samples.

21. The method of claim 19, wherein said synchronous information is composed of given bits from the most significant bits of a given number of samples taken from the location spaced from the head of the block by a given number of samples.

22. A method for encoding sub code, comprising the steps of:

forming one or more blocks at a constant information unit such that a part of a main information is added as synchronous information to a sub code, said main information and said sub code comprising an input signal; and encoding said input signal such that said sub code is encoded together with said synchronous information;

wherein said synchronous information is configured to synchronize said main information and said sub code, and is composed of a given number of samples taken from the location spaced from the tail of the block by a given number of samples.

23. The method of claim 22, wherein said synchronous information is composed of given bits from the least significant bits of a given number of samples taken from the location spaced from the tail of the block by a given number of samples.

24. The method of claim 22, wherein said synchronous information is composed of given bits from the most significant bits of a given number of samples taken from the location spaced from the tail of the block by a given number of samples.

25. A recording medium characterized in recording a signal composed of main information and sub code and having blocks formed at a constant information unit so that said sub code contains synchronous information corresponding to a part of the main information of the corresponding block to said sub code.

26. A method for reproducing a signal, comprising the steps of:

dividing a signal composed of main information and sub code having blocks formed at a constant information unit, said signal being reproduced from a recording medium and having, said sub code with synchronous information corresponding to a part of said main information of the corresponding block to said sub code, into said main information and said sub code;

detecting said synchronous information from said sub code;

extracting a block of said sub code corresponding to said main information divided at said dividing step; and synthesizing a block of said sub information with a block of said main information and outputting said synthesized result.

27. The method of claim 26, wherein said signal is a digital video signal.

28. The method of claim 26, wherein said step of synthesizing generates at least a portion of said synchronous information at each block.

29. The method of claim 26, wherein said step of synthesizing generates said synchronous information at each group of a predetermined number of blocks.

30. The method of claim 26, wherein said synchronous information includes a predetermined number of samples from a head of a block.

31. The method of claim 30, wherein said synchronous information includes predetermined bits from the least significant bits of a given number of samples from a head of the block.

32. The method of claim 30, wherein said synchronous information includes predetermined bits from the most significant bits of a given number of bits from a head of the block.

33. The method of claim 26, wherein said synchronous information includes a predetermined number of samples from a tail of a block.

34. The method of claim 33, wherein said synchronous information includes predetermined bits from the least significant bits of a predetermined number of samples from a tail of the block.

35. The method of claim 33, wherein said synchronous information includes predetermined bits from the most significant bits of a predetermined number of samples from a tail of the block.

36. The method of claim 26, wherein said synchronous information includes a predetermined number of samples from a head and a tail of a block, respectively.

37. The method of claim 36, wherein said synchronous information includes predetermined bits from the least significant bits of a predetermined number of samples from the head and the tail of the block, respectively.

38. The method of claim 36, wherein said synchronous information includes predetermined bits from the most significant bits of a predetermined number of samples from the head and the tail of the block, respectively.

39. The method of claim 26, wherein said synchronous information includes a predetermined number of samples from the location spaced from a head of a block by a predetermined number of samples.

40. The method of claim 39, wherein said synchronous information includes predetermined bits from the least significant bits of a predetermined number of samples from the location spaced from the head of the block by a given number of samples.

41. The method of claim 39, wherein said synchronous information includes predetermined bits from the most significant bits of a predetermined number of samples from the location spaced from the head of the block by a given number of samples.

42. The method of claim 26, wherein said synchronous information includes a predetermined number of samples from the location spaced from a tail of a block by a predetermined number of samples.

43. The method of claim 42, wherein said synchronous information includes predetermined bits from the least significant bits of a predetermined number of samples from the location spaced from the tail of the block by a given number of samples.

44. The method of claim 42, wherein said synchronous information includes predetermined bits from the most significant bits of a predetermined number of samples from the location spaced from the tail of the block by a given number of samples.

45. The method of claim 26, wherein said synchronous information is a parameter for representing features of said main information.

46. The method of claim 26, wherein said synchronous information is changed according to the content of the main information.

47. The method of claim 46, further including the step of encoding, with said sub code, a generation information of said synchronous information changing according to the content of said main information.

48. The method of claim 26, wherein said signal is a digital audio signal.

49. A signal reproducing apparatus, comprising:
  means for dividing a signal composed of main information and sub code having blocks formed at a constant information unit, said signal reproduced from a recording medium and having said sub code with synchronous information corresponding to part of said main information of the corresponding block to said sub code, into said main information and said sub code;
  means for detecting said synchronous information from said sub code divided by said dividing means;
  means for extracting a block of said sub code corresponding to said main information divided by said dividing means from said synchronous information detected by said detecting means; and
  means for synthesizing a block of said sub code extracted by said extracting means with a block of the corresponding main information and outputting said synthesized block.

50. The apparatus of claim 27, wherein said synthesizing means generates at least a portion of said synchronous information at each block.

51. The apparatus of claim 27, wherein said synthesizing means generates said synchronous information at each group of a predetermined number of blocks.

52. The apparatus of claim 27, wherein said synchronous information includes a predetermined number of samples from a head of a block.

53. The apparatus of claim 52, wherein said synchronous information includes predetermined bits from the least significant bits of a given number of samples from a head of the block.

54. The apparatus of claim 52, wherein said synchronous information includes predetermined bits from the most significant bits of a given number of bits from a head of the block.

55. The apparatus of claim 27, wherein said synchronous information includes a predetermined number of samples from a tail of a block.

56. The apparatus of claim 55, wherein said synchronous information includes predetermined bits from the least significant bits of a predetermined number of samples from a tail of the block.

57. The apparatus of claim 55, wherein said synchronous information includes predetermined bits from the most significant bits of a predetermined number of samples from a tail of the block.

58. The apparatus of claim 27, wherein said synchronous information includes a predetermined number of samples from a head and a tail of a block, respectively.

59. The apparatus of claim 58, wherein said synchronous information includes predetermined bits from the least significant bits of a predetermined number of samples from the head and the tail of the block, respectively.

60. The apparatus of claim 58, wherein said synchronous information includes predetermined bits from the most significant bits of a predetermined number of samples from the head and the tail of the block, respectively.

61. The apparatus of claim 27, wherein said synchronous information includes a predetermined number of samples from the location spaced from a head of a block by a predetermined number of samples.

62. The apparatus of claim 61, wherein said synchronous information includes predetermined bits from the least significant bits of a predetermined number of samples from the location spaced from the head of the block by a given number of samples.

63. The apparatus of claim 61, wherein said synchronous information includes predetermined bits from the most significant bits of a predetermined number of samples from the location spaced from the head of the block by a given number of samples.

64. The apparatus of claim 27, wherein said synchronous information includes a predetermined number of samples from the location spaced from a tail of a block by a predetermined number of samples.

65. The apparatus of claim 64, wherein said synchronous information includes predetermined bits from the least significant bits of a predetermined number of samples from the location spaced from the tail of the block by a given number of samples.

66. The apparatus of claim 64, wherein said synchronous information includes predetermined bits from the most significant bits of a predetermined number of samples from the location spaced from the tail of the block by a given number of samples.

67. The apparatus of claim 27, wherein said synchronous information is a parameter for representing features of said main information.

68. The apparatus of claim 27, wherein said synchronous information is changed according to the content of the main information.

69. The apparatus of claim 68, further including encoding means for encoding, with said sub code, a generation information of said synchronous information changing according to the content of said main information.

70. The apparatus of claim 27, wherein said signal is a digital audio signal.

71. The apparatus of claim 27, wherein said signal is a digital video signal.

72. A signal reproducing apparatus, comprising:
  a signal dividing section for dividing a signal composed of main information and sub code having blocks formed at a constant information unit, said signal reproduced from a recording medium and having said sub code with synchronous information corresponding to part of said main information of the corresponding block to said sub code, into said main information and said sub code;
  a signal detection section for detecting said synchronous information from said sub code divided by said signal dividing section;
  an extraction section for extracting a block of said sub code corresponding to said main information divided by said dividing means from said synchronous information detected by said signal detecting section; and
  a synthesizing section for synthesizing a block of said sub code extracted by said extraction section with a block of the corresponding main information and outputting said synthesized block.

73. The apparatus of claim 72, wherein said synthesizing section generates at least a portion of said synchronous information at each block.

74. The apparatus of claim 72, wherein said synthesizing section generates said synchronous information at each group of a predetermined number of blocks.

75. The apparatus of claim 72, wherein said synchronous information includes a predetermined number of samples from a head of a block.

76. The apparatus of claim 75, wherein said synchronous information includes predetermined bits from the least significant bits of a given number of samples from a head of the block.

77. The apparatus of claim 75, wherein said synchronous information includes predetermined bits from the most significant bits of a given number of bits from a head of the block.

78. The apparatus of claim 72, wherein said synchronous information includes a predetermined number of samples from a tail of a block.

79. The apparatus of claim 78, wherein said synchronous information includes predetermined bits from the least significant bits of a predetermined number of samples from a tail of the block.

80. The apparatus of claim 78, wherein said synchronous information includes predetermined bits from the most significant bits of a predetermined number of samples from a tail of the block.

81. The apparatus of claim 72, wherein said synchronous information includes a predetermined number of samples from a head and a tail of a block, respectively.

82. The apparatus of claim 81, wherein said synchronous information includes predetermined bits from the least significant bits of a predetermined number of samples from the head and the tail of the block, respectively.

83. The apparatus of claim 81, wherein said synchronous information includes predetermined bits from the most significant bits of a predetermined number of samples from the head and the tail of the block, respectively.

84. The apparatus of claim 72, wherein said synchronous information includes a predetermined number of samples from the location spaced from a head of a block by a predetermined number of samples.

85. The apparatus of claim 84, wherein said synchronous information includes predetermined bits from the least significant bits of a predetermined number of samples from the location spaced from the head of the block by a given number of samples.

86. The apparatus of claim 84, wherein said synchronous information includes predetermined bits from the most significant bits of a predetermined number of samples from the location spaced from the head of the block by a given number of samples.

87. The apparatus of claim 72, wherein said synchronous information includes a predetermined number of samples from the location spaced from a tail of a block by a predetermined number of samples.

88. The apparatus of claim 87, wherein said synchronous information includes predetermined bits from the least significant bits of a predetermined number of samples from the location spaced from the tail of the block by a given number of samples.

89. The apparatus of claim 87, wherein said synchronous information includes predetermined bits from the most significant bits of a predetermined number of samples from the location spaced from the tail of the block by a given number of samples.

90. The apparatus of claim 72, wherein said synchronous information is a parameter for representing features of said main information.

91. The apparatus of claim 72, wherein said synchronous information is changed according to the content of the main information.

92. The apparatus of claim 91, further including an encoder for encoding with said sub code, a generation information of said synchronous information changing according to the content of said main information.

93. The apparatus of claim 72, wherein said signal is a digital audio signal.

94. The apparatus of claim 72, wherein said signal is a digital video signal.

* * * * *